(12) United States Patent
Ferroussat

(10) Patent No.: US 6,983,300 B2
(45) Date of Patent: Jan. 3, 2006

(54) ARITHMETIC UNIT

(75) Inventor: Sebastien Ferroussat, Fontaine (FR)

(73) Assignee: STMicroelectronics S.A., Gentilly (FR)

( * ) Notice: Subject to any disclaimer, the term of this patent is extended or adjusted under 35 U.S.C. 154(b) by 715 days.

(21) Appl. No.: 09/919,482

(22) Filed: Jul. 30, 2001

(65) Prior Publication Data

US 2002/0038202 A1    Mar. 28, 2002

(30) Foreign Application Priority Data

Aug. 1, 2000    (EP) .................................. 00410091

(51) Int. Cl.
*G06F 7/50*    (2006.01)
(52) U.S. Cl. ...................................... 708/552; 708/553
(58) Field of Classification Search ........ 708/551–553, 708/497–498
See application file for complete search history.

(56) References Cited

U.S. PATENT DOCUMENTS

| 5,164,914 A | * | 11/1992 | Anderson | .................... 708/552 |
| 5,677,860 A | * | 10/1997 | Yazawa et al. | ............. 708/552 |
| 2002/0103842 A1 | * | 8/2002 | Goldovsky | .................. 708/552 |

\* cited by examiner

*Primary Examiner*—D. H. Malzahn
(74) *Attorney, Agent, or Firm*—Lisa K. Jorgenson; James H. Morris; Wolf, Greenfield & Sacks, P.C.

(57) ABSTRACT

An arithmetic unit for adding a plurality of values to define a result, the arithmetic unit including circuitry for receiving the plurality of values; circuitry for adding the plurality of values to define a result, the result being within a first range; circuitry for determining if the result falls within a second range, the second range being smaller than the first range, the circuitry arranged to consider only some of the bits of the result; and circuitry for modifying the result in so that the result output by said arithmetic unit falls within the second range.

26 Claims, 3 Drawing Sheets

ARITHMETIC UNIT

FIELD OF THE INVENTION

The present invention relates to an arithmetic unit and in particular but not exclusively to an arithmetic unit for use in a digital signal processor.

BACKGROUND OF THE INVENTION

In known arithmetic units, it is possible to calculate a multiply accumulate function. In a multiply accumulate function, a first number X is multiplied by a second number Y and added to an accumulator ACCU. In mathematical notation, the result RES of this function can be represented as follows: RES=ACCU+X*Y.

Reference is made to FIG. 1 which shows a block diagram of an arithmetic unit 2 which is able to add together two partial products P1 and P2 and the accumulator. The arithmetic unit 2 has a first register 4 which stores the value P1 and a second register 6 which stores the value P2. When X is multiplied by Y, two partial products P1 and P2 result, with P1+P2=X*Y. These values P1 and P2 are stored in the first and second registers 4 and 6 respectively.

The current accumulator ACCU is stored in a third register 8. In order to obtain the result RES, two further steps are carried out. The three vectors P1, P2 and the accumulator ACCU are reduced to two vectors through a carry save adder stage 10. The carry save adder stage 10 actually comprises a number of individual 3 to 2 carry save adders each of which provides two outputs. One of those outputs is a sum output and the other output is a carry output. The number of carry save adders making up the carry save adder stage will at least be equal to the number of bits of the resister P1, the register P2 or the accumulator ACCU.

As discussed hereinbefore, each individual carry save adder provides two outputs, a carry output and a sum output. As there are several carry save adders in parallel, a sum vector and a carry vector are obtained. These vectors are input to a global adder 12. The global adder 12 provides the result RES.

When the first value P1, the second value P2 and the third value ACCU are added together, the result RES may fall outside a permitted range of values.

SUMMARY OF THE INVENTION

It is therefore an aim of embodiments of the present invention to ensure that the final result is within a permitted range of values.

According to one aspect of the present invention, there is provided an arithmetic unit for adding a plurality of values to define a result, said arithmetic unit comprising means for receiving said plurality of values; means for adding said plurality of values to define a result, said result being within a first range; means for determining if said result fall within a second range, said second range being smaller than the first range; and means for modifying said result in so that the result output by said arithmetic unit falls within the second range.

In this way, it can be ensured that the output of the arithmetic unit always falls within the second range. When the result falls outside the second range, the result is sometimes referred to as having overflowed. When it is modified to fall inside the second range, it is referred to as being clamped or saturated.

In one embodiment of the present invention, three values may be added together. Two of those values may be a partial product whilst the third of those values may be an accumulation result.

Accordingly, the arithmetic unit embodying the present invention can be used for multiply accumulate functions.

The adding means may comprise a carry save adder. The carry save adder may comprise a plurality of 3 to 2 carry save adders. The adding means may comprise an adder stage for providing said result. The adder stage may add the two outputs of the carry save adder stage to provide a single result.

The determining means may be arranged to take into account the bits other than the considered bits. Only some of the bits of each of the plurality of values may be used perform a predecoding as to whether or not the result falls outside the second range. A bit generated by the addition of all the other bits of the plurality of values may also be used. This bit may enable the achievement of decoding as to whether or not the result falls outside the second range. This may take the form of a carry.

The second range can be expressed by N bits and bits N, N−1 and possibly the N−2 of at least some of the plurality of values may be considered. The number of bits which are considered may depend on the number of values, the range of each value and/or the required range of the final result.

The arithmetic unit may be arranged to operate in 2's complement binary arithmetic. This means that positive and negative numbers can be represented.

A first of the plurality of values may have an N bit format and may fall in the range $-2^{N-1}$ to $2^{N-1}-1$. The sum of a second and a third of the plurality of values may fall in the range of $-2^{N-1}$ to $2^{N-1}$. The first range may $-2^N$ to $2^N-1$ and the second range may be $-2^{N-1}$ to $2^{N-1}-1$. A round may be introduced when generating first and second partial product values. This round may consist of adding $2^{N/2-1}$ to the result go that the first range may be $-2^N$ to $2^N-1+2^{(N/2)-1}$.

The determining means may consider bits N down to N−2 where three values are used. A first carry save addition of bits N−2, a second carry save addition of bits N−1 of all of said plurality of values and a third carry save addition of bits N from two of said plurality of values and bit N−1 from a further one of said plurality of values may be considered by the determining means. The further one of the plurality of values may be an accumulator value whilst the other two values may be partial product values. Bits of significance greater than or equal to N−1 only, resulting form the three carry save additions may be taken into account by the determining means and may be added together by a forth addition. A fifth addition may be performed between the resulting bits and a carry generated by the additions of bits N−2 down to 0 of the three values. If the result of the fifth addition has first and second bits which are different, then said result falls outside said second range. If the first and second bits are the same, then the result falls within the second range.

The calculation generating the carry used in the fifth addition may be performed in the same way as described previously. First a carry save addition may be performed on the three values. Then the resulting two values may be added together in a final addition. The carry used by the determining means may be the one out column N−2 of the final addition.

The means for modifying the result may be arranged to receive information as to the sign of the total of two of said plurality of values and information as to one bit of a further one of said values to determine if the result can fall out of said second range at the positive end thereof or the negative end thereof. The modifying means may modify the result to have a maximum positive or maximum negative value of said second range depending on which end of the second range the result can fall out of and if the result is determined to fall outside said second range.

A plurality of registers may be provided for storing said plurality of values.

BRIEF DESCRIPTION OF THE DRAWINGS

For a better understanding of the present invention and as to how the same may be carried into effect, reference will now be made by way of example to the accompanying drawings in which.

DESCRIPTION OF THE PREFERRED EMBODIMENTS

Figure 1:
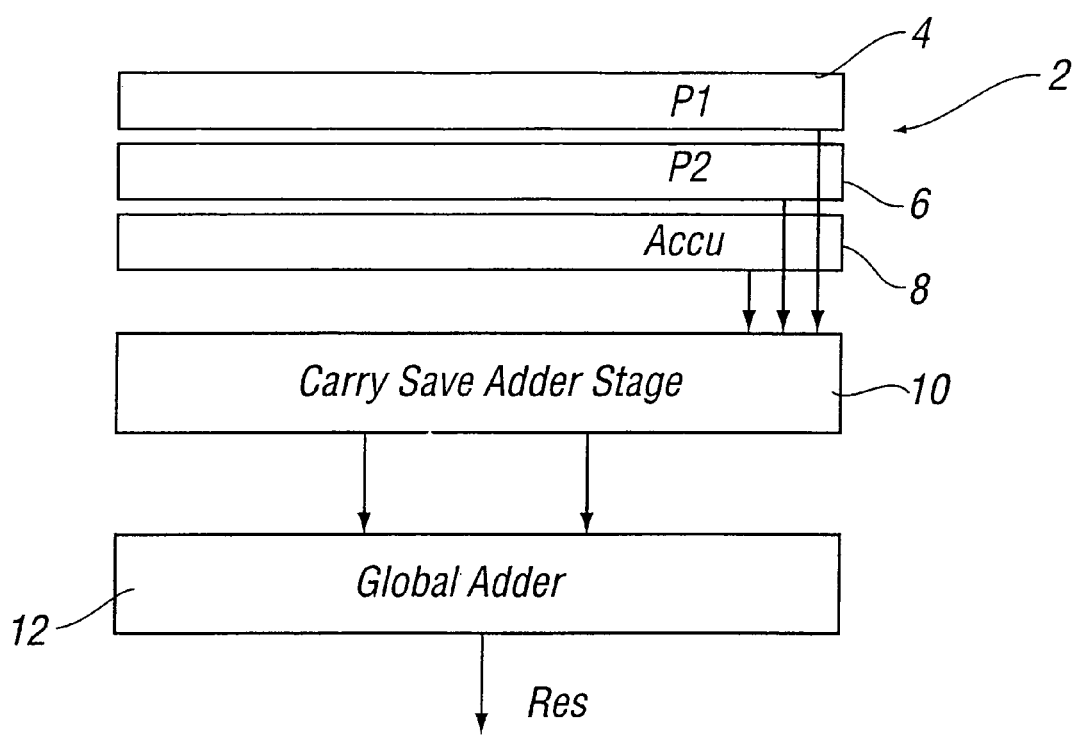
FIG. 1 shows a known arithmetic unit.
Figure 2:
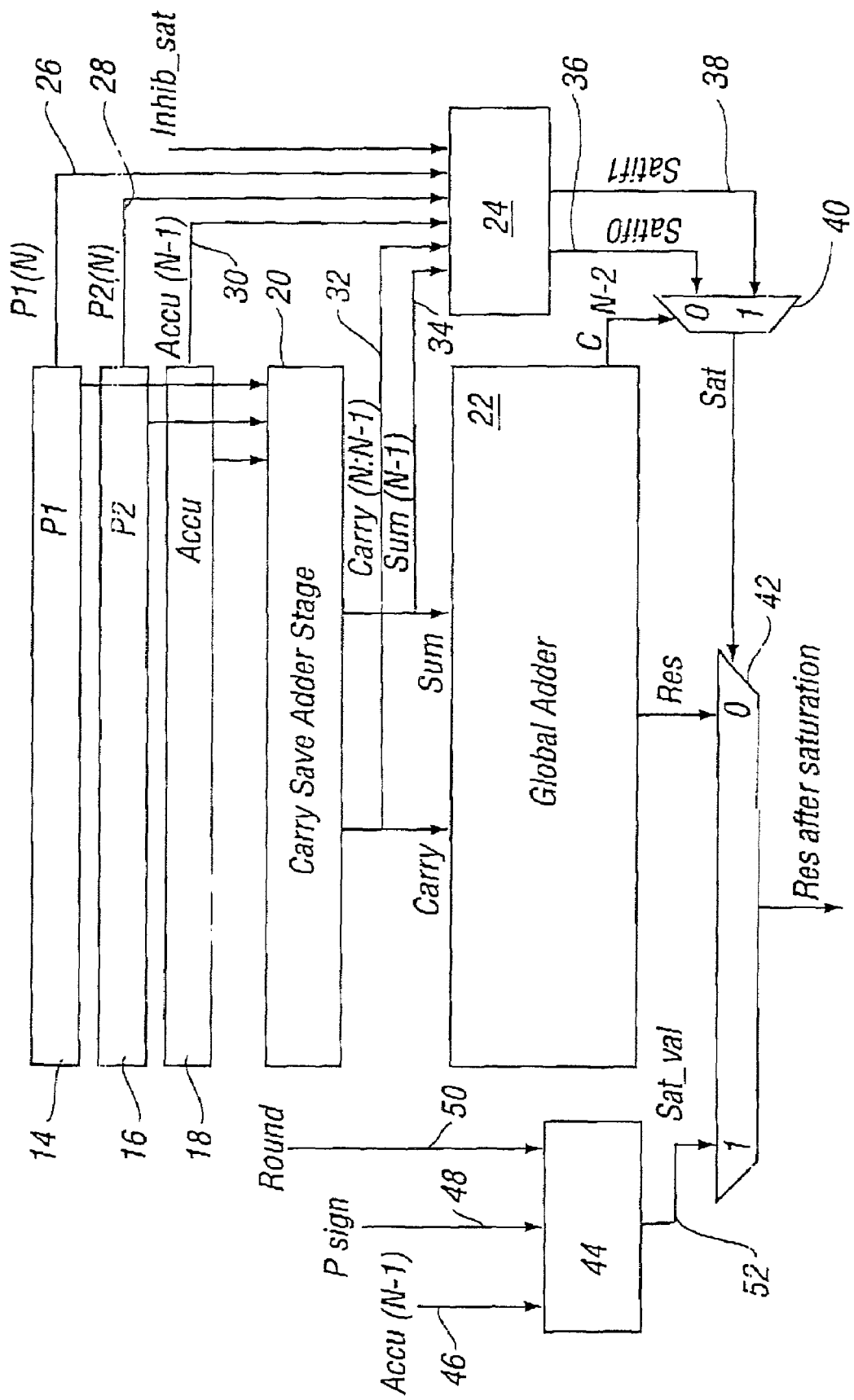
FIG. 2 shows a block diagram of an arithmetic unit embodying the present invention.

The embodiment shown in FIG. 2 is arranged to carry out a multiply accumulate function where RES=ACCU+X*Y. As discussed in relation to the FIG. 1, X is the number to be multiplied and Y is the multiplier. ACCU is the accumulator value which may be increasing or decreasing and RES is the result of the function.

X and Y are initially multiplied to generate two partial products P1 and P2. The generation of two partial products from two numbers multiplied together is well known in the art and will not be described further here. The result of the multiplication P, is defined as being equal to P1+P2.

As with the arithmetic unit shown in FIG. 1, a first register 14 is provided for storing the first partial product P1 and a second register 16 is provided for storing the second partial product P2. 2's complement arithmetic is used. The first bit of a signed number indicates if the number is positive or negative. The usual convention is that if the first bit has the value "1" then the number is a negative number whereas if the first bit has the value "0", then the number is a positive number.

A third register 18 is provided for the current accumulator ACCU. The third register 18 stores a N-bit value. The value of the N bit data will fall in the range of $-2^{N-1}$ to $2^{N-1}-1$, as it is expressed it 2's complement arithmetic.

The product P resulting from the sum of P1+P2 will be in the range $-2^{N-1}$ to $2^{N-1}$. P1 may be a N+2 bit negative value and P2 may be a N+3 bit positive value. However P1 and P2 can have other formats. P1 and P2 are such that their sum always falls within the range $-2^{N-1}$ to $2^{N-1}$.

When the N least significant bits of the accumulator are added to the product P, the final result will be in the range $-2^N$ to $2^N-1$.

A round may also be performed on the final result. In other words, the N/2 least significant bits can be cleared. In one embodiment of the present invention, a round is performed by adding $2^{(N/2)-1}$ to the partial products and then clearing the N/2 least significant bits from the result RES. Clearing the N/2 least significant bits can be equated to setting those bits to "0".

The final result, after rounding, will therefore be in the range of $-2^N$ to $2^N+2^{(N/2-1)}-1$. However, saturation has to be performed in order to keep the result within the range $-2^{N-1}$ to $2^{N-1}-1$. The circuitry for ensuring that the result is saturated or is within the required range will be described in more detail hereinafter.

The output of the first second and third registers 14, 16 and 18 are input to a carry save adder stage 20. As with the arithmetic unit of FIG. 1, the carry save adder stage comprises a number of 3 to 2 carry save adders. The number of carry save adders may be equal to N+1. N carry save adders are required if N bits of the accumulator ACCU are taken into account. One further carry save adder is required if overflow detection is considered. Each carry save adder receives one input from each of the three registers 14, 16 and 18 and provides a carry output and a sum output. Each of these carry and sum outputs are input to a global adder stage 22. The global adder stage 22 comprises a number of adders each of which adds a carry output and a sum output to provide a respective one of the bits of the result.

The principal behind overflow decoding will now be discussed. The maximum value is $2^N+2^{(N/2-1)}-1$, before saturation. In 2's complement arithmetic, this value is expressed by N+2 bits. The minimum before saturation is $-2^N$ which can be expressed in N+1 bits.

One way of identifying that saturation is required will be described with reference to FIG. 3. Numbers in the first range $-2^N$ to $2^N+2^{(N/2-1)}-1$ are expressed on N+2 bits, that is bit 0 to bit N+1. To write down the most positive values in the range requires N+2 bits. Numbers in the second range $-2^{N-1}$ to $2^{N-1}-1$ are expressed on N bits, that is bit 0 to bit N-1.

To check if there is an overflow the following bits are checked:

bits greater than bit N-1 are equal to bit N-1 if the number is in the second range. The bits N-1 and greater should be checked; and bits over bit N+1, that is the N+2$^{th}$ bit as bits are counted from 0, will always be the same if the number is in the first range.

It is therefore not necessary to check bits over bit N+1. Bits N+1, N and N-1 should be checked. However, embodiments of the present invention are able to suppress the check on bit N+1. A very few number of values actually require the N+2 bit format in the first range. These values are the ones in the range $2^N$ to $2^N-1+2^{N/2-1}$. These values have the property that bits N+1, N and N-1 have the values 0, 1 and 0 As bits N and N-1 are different for these values, it is sufficient to check these two bits to declare these values are outside the second range. Thus, bit N+1 doesn't need to be checked for the values in the range $2^N$ to $2^N-1+2^{N/2-1}$.

For the other values of the first range, that is values in the range $-2^N$ to $2^N-1$, these are expressed on N+1 bits only, that is bits 0 to N. It is therefore sufficient to check bits N-1 and N.

Figure 3:
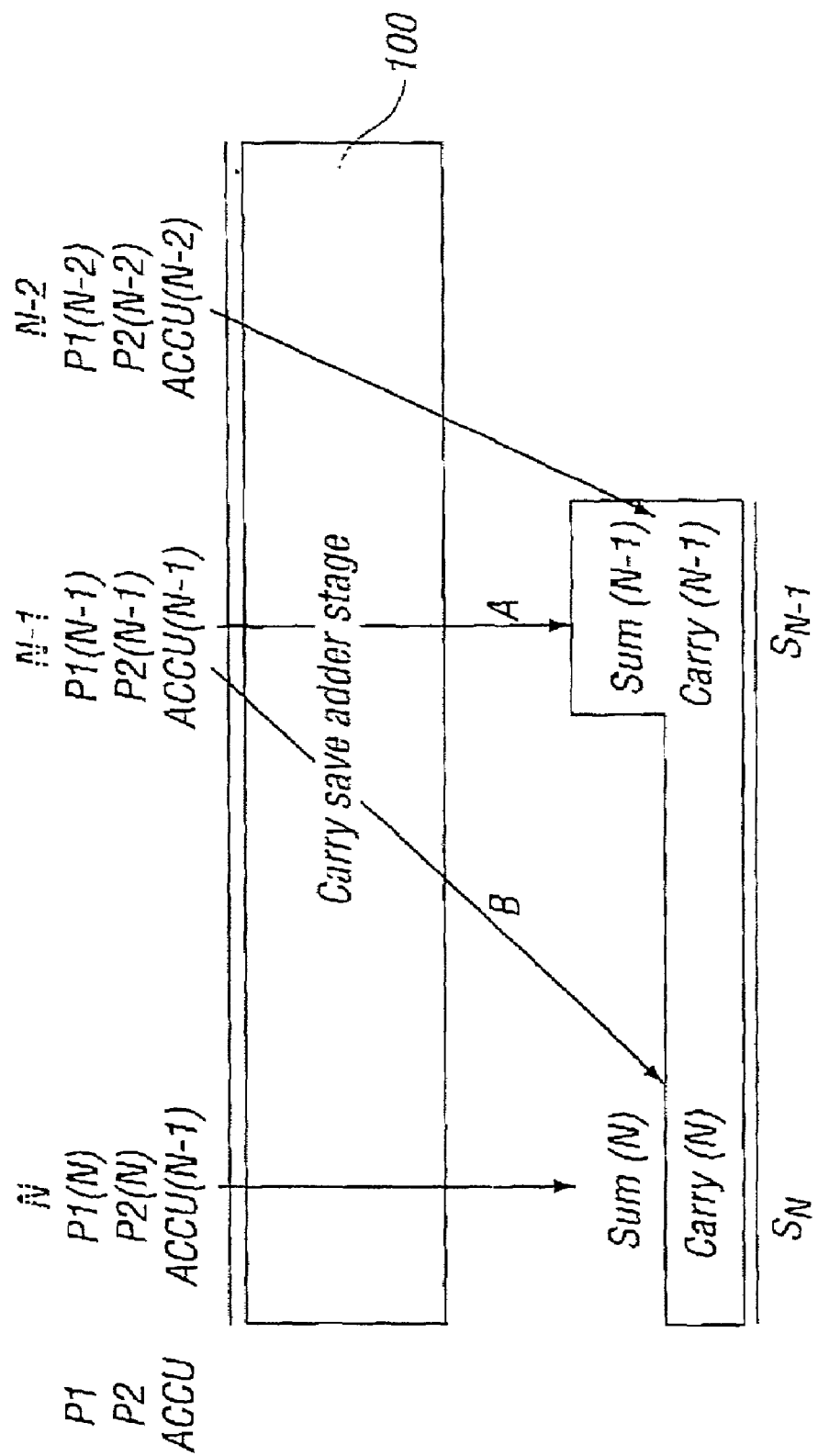
FIG. 3 illustrates the calculation performed by the arithmetic unit.

Reference is made to FIG. 3 which shows how these principles can be applied in embodiments of the present invention. The partial products P1 and P2 are used as is the accumulator ACCU. The accumulator ACCU has a N bit format, that is it can be expressed on N bits, that is 0 to N-1. Bit N is a copy of bit N-1 obtained by carrying out a sign extension. In FIG. 3, only bits N, N-1 and N-2 are shown.

A carry save adder stage 100 enables P1, P2 and ACCU to be reduced to a sum vector and a carry vector.

The values of interest are Carry(N-1), Sum(N-1), Carry (N) and Sum (N). Carry(N-1) is generated by the carry save adder 100 receiving bits N-2 from the two partial products P1 and P2 and bit N-2 from the accumulator ACCU.

Sum(N−1) and carry(N) are generated by the carry save adder receiving bits N−1 from the partial products P1 and P2 and ACCU.

Sum (N) is generated by the carry save adder 100 receiving the bit N from the two partial products P1 and P2 and bit N−1 from ACCU.

Carry (N), Carry (N−1), Sum (N) and Sum (N−1) are added together to generate SN−1 and SN. The carry from the previous column N−2 is taken into account and is added to S(N−1). This carry CN−2 is the carry generated out of column N−2 when performing the addition of Sum (N−2 down to 0) and Carry (N−2 down to 0)

When performing the addition
SN SN−1
÷CN−2 the bits N and N−1 of the result of the multiply accumulate function are obtained. These bits are compared. If they are not equal, there is an overflow as explained above. To speed up detection, SN and SN−1 are first calculated, without taking into account CN−2. According to the values SN and SN−1, it is defined which values of CN−2 give an overflow.

The carry save adder stage 20 will add bits N−1 from the first to third registers 14 to 18 to provide a sum output Sum (N−1) and a carry output Carry(N) as illustrated in FIG. 3 by arrows A and B respectively. These values are output to the global adder 22 and also to a calculation unit 24 via inputs 32 and 34. Bits N−2 from the first, second and third registers 14 to 18 are summed to provide the carry output Carry (N−1). The bit Carry (N−1) is transmitted to the detection unit 24 via line 32.

The calculation unit 24 also receives the following inputs: bit N from the first register 14 via line 26, bit N from the second register 16 via line 28 and bit N−1 of the third register 18 via line 30. Bit N−1 of the third register is taken into account instead of bit N. This is because this register is the accumulator and only N bits of the accumulator are taken into account. Bit N, that is the N+1 bit is a sign extension and so is a copy of bit N−1. Using these values, the calculation unit is able to calculate the values SN and SN−1. SN−1 is the sum of Sum(N−1) from the carry save adder stage and the Carry(N−1) from the carry save adder stage. Value SN is the sum of Sum(N), Carry(N) and the carry resulting from the summing of Sum(N−1) and Carry(N−1). Sum (N) is calculated in the calculation unit 24 by adding bit N from the first and second registers and bit N−1 of the third register. Carry (N) is from the carry save adder stage 20.

Reference is made to the table 1 which summarises the cases where an overflow will occur.

| $S_N$ | $S_{N-1}$ | OVERFLOW |
|---|---|---|
| 0 | 0 | Overflow if $C_{N-2}$ = '1' |
| 0 | 1 | Always overflow |
| 1 | 0 | Overflow if $C_{N-2}$ = '0' |
| 1 | 1 | No overflow |

The calculation unit 24 provides two outputs. The first output 36 Satif0 will be high to indicate that saturation is required if the carry CN−2 is zero whereas the second output 38 Satif1 will be high to indicate that saturation will occur if the carry CN−2 is 1. If SN and SN−1 are both 0, then a high output will be provided via the second output Satif1. If SN is 0 and SN−1 is 1, then a high output will be provided on both the Satif0 output 36 and the Satif1 output 36 as an overflow will always be provided regardless of the value of the carry CN−2. If SN has the value 1 and SN−1 is equal to 0, then a high output will be provided on the first output Satif0 36 as an overflow will be provided if the carry CN−2 is zero. Finally, if SN and SN−1 are both 1, then a zero output is provided via the first and second output Satif0 or Satif1 as no overflow will occur.

The first and second outputs 36 and 38 are input to a first multiplexer which is controlled by the carry CN−2 which is output from the global adder 22. If there is saturation, the output of the first multiplexer 40 provides a high signal to a second multiplexer 42 from which ever of the first and second outputs 36 and 38 of the calculation units 34 is high. In particular, if the carry value CN−2 is 1, then the second output 38 Satif1 will be output by the first multiplexer 40. If the carry value CN−2 is 0, then the first output 36 Satif0 will be output by the first multiplexer 40. If there is no saturation, then the first multiplexer 40 provides a zero output to the second multiplexer 42.

In summary, satif1=not(SN) and satif0=SN XOR SN−1 where XOR is an exclusive or function.

If sat=0, then the multiplexer 42 will output the Res value. If sat=1, then there is an overflow and the value out of the multiplexer 42 is the saturation value generated by unit 44.

In an alternative embodiment of the present invention, not(satif0) and not(satif1) are generated instead of satif0 and satif1 respectively. This provides a saturation signal which is the opposite to that of the arrangement described previously. This signal has the value 1 if there is no overflow and 0 if there is an overflow. The correct output of the multiplexer 42 is obtained by permutation the inputs of the multiplexer. The result value is connected on input '1' of the multiplexer 42 and Sat_val is connected to input '0' of multiplexer 42. This way, when the signal has the value 0 and there is an overflow, the output of the multiplexer 42 is Sat_val. When the signal has the value 1 and there is no overflow, then the output of the multiplexer is the Res value.

Once detection of an overflow or saturation situation has occurred, it is necessary to define the saturation value which should replace the actual calculated value. Overflow occurs when the result RES falls outside the permitted range. In the case of a negative value, the saturation value will be $-2^{N-1}$. In the case of a positive value, the saturation value will be $2^{N-1}-1$. This is determined by the saturation unit 44. The saturation unit 44 receives three inputs 46 to 50. The first input 46 provides bit N−1 of the third register 38. The second input 48 provides the sign of the sum of P1+P2. The third input 50 provides an indication as to whether or not a round takes place. When a round is performed, the N/2 least significant bits are cleared.

Table 2 summarises whether or not a positive or negative overflow takes place.

| ACCU and P sign | No round performed | Round performed (adding $2^{(N/2)-1}$) |
|---|---|---|
| ACCU > 0,P > 0 | Positive OVF | Positive OVF |
| ACCU < 0,P < 0 | Negative OVF | Negative OVF |
| ACCU > 0,P < 0 | No possible OVF | Positive OVF |
| ACCU < 0,P > 0 | No possible OVF | Positive OVF |

Taking into account the range of the accumulator value and of the product P, the sign of the two data and if a round is performed, the type of overflow condition (positive overflow, negative overflow or no possible overflow) can be determined. If the accumulation value ACCU and the product P are greater than zero, a positive overflow is possible.

If the accumulation value ACCU and the product P are both less than zero, a negative overflow is possible. If the accumulation value ACCU and the product P have the opposite sign, then overflow is not possible without rounding. If rounding does take place then positive overflow may occur. The saturation unit 44 provides the saturation value 52 according to the inputs 46, 48 and 50. When a negative overflow is possible the value 52 is $-2^{N-1}$. When a positive overflow is possible and there is no rounding, the value 52 is $2^{N-1}-1$. When a positive overflow is possible and there is rounding, the value 52 is $2^{N-1}-2^{N/2}$.

The output 52 of the saturation unit 44 is input to the second multiplexer 42 along with the output from the global adder stage 22. If an overflow has occurred as determined by the calculation unit 24, the saturation value will replace the result RES output by the global adder stage 22. If, on the other hand, saturation is not required, then the result RES of the global adder stage 22 will be output by the second multiplexer 42. The output of the first multiplexer 40 will control the output of the second multiplexer 42 to select either the output of the saturation unit 44 or the output of the global adder stage 22 depending on whether or not the result determined by the global adder stage 22 fall within or outside the permitted range.

When an overflow occurs, the result RES is replaced by the saturation value. If a negative overflow occurs, that is the result RES is below the minimum value $-2^{N-1}$, then the saturation value is the minimum value that can be expressed in N bits in 2's complement arithmetic, that is $-2^{N-1}$. If a positive overflow occurs, that is the result RES is greater than the maximum value $2^{N-1}-1$, the saturation value is the maximum positive value $2^{N-1}-1$ if no round has to be performed or if a round has to be performed, the maximum positive value with the N/2 least significant bits cleared, that is $2^{N-1}-2^{N/2}$. Thus it is possible to perform all the overflow detection calculation in parallel with the calculation of the results RES (and the carry CN–2). Then the final detection of the overflow can be obtained as soon as CN–2 is available. It is done this way, because CN–2 gives the ability to take into account bits N–2 down to 0 of the operands, but it is the latest available signal required for overflow detection.

In alternative embodiments of the present invention, it is possible to perform the same saturation detection using other signals from the registers 14 to 16, the carry save adder stage, or the global adder.

It should be appreciated that embodiments of the present invention can be incorporated in a digital signal processor. Embodiments of the present invention can be incorporated in an integrated circuit.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. An arithmetic unit for adding a plurality of values, each value falling within the range $-2^{N-1}$ to $2^{N-1}-1$, to define a result, said arithmetic unit comprising:
   an input for receiving said plurality of values;
   an adder for adding said plurality of values to define a result, said result being within a first range $-2^{N-1}$ to $2^{N-1}-1$;
   circuitry for performing a round on the result to define a rounded result, wherein the rounded result falls within a third range $-2^N$ to $2^N-1+2^{(N/2)-1}$;
   a detector for determining if said rounded result falls within a second range $-2^{N-1}$ to $2^{N-1}-1$, said second range being smaller than the third range, said detector being arranged to consider only some of the bits of said rounded result; and
   circuitry for modifying said rounded result in so that the result output but said arithmetic unit falls within the second range.

2. A unit as claimed in claim 1, wherein three values are added together.

3. A unit as claim in claim 2, wherein at least one of the following values is calculated;
   a first carry value is generated from the bits N–2 from said three values;
   a second carry value is generated from the bits N–1 of said three values;
   a first sum value is generated from the bits N–1 of said three values; and
   a second sum is generated from the bits N of two of said values and bit N–1 of one of the values.

4. A unit as claimed in claim 3, wherein said first and second carry values and said first and second sums are generated to provide first and second result values.

5. A unit is claimed in claim 4, wherein the detector determines if the second range is exceeded based on said first and second results and a third carry value.

6. A unit as claimed in claim 5, wherein said third carry value is determined from an addition of a sum and a carry value for bits N–2 down to 0 of said values.

7. A unit as claimed in claim 1, wherein said adder comprises a carry save adder stage.

8. A unit as claimed in claim 7, wherein said carry save adder stage comprises a plurality of 3 to 2 carry save adders.

9. A unit as claimed in claim 1, wherein said adding means comprises an adder stage for providing said result.

10. A unit as claimed in claim 1, wherein said detector is arranged to take into account bits other than the considered bits.

11. A unit as claimed in claim 1, wherein the second range can be expressed by N bits and bits N to N–2 of at least some of the plurality of values are considered by said detector.

12. A unit as claimed in claim 1, wherein the arithmetic unit is arranged to operate in 2's complement binary arithmetic.

13. A unit as claimed in claim 12, wherein the sum of a second and a third of said plurality of values falls in the range $-2^{N-1}$ to $2^{N-1}$.

14. A unit as claimed in claim 12, wherein a first of said plurality of values has an N bit format and falls in the range $-2^{N-1}$ to $2^{N-1}-1$.

15. A unit as claimed in claim 1, wherein the unit is arranged such that if the detector determines that the result falls outside said second range, the modifying circuitry replaces the rounded result by a saturation value.

16. A unit as claimed in claim 15, wherein the modifying circuitry is arranged to provide a first saturation value if one end of the range is exceeded and another saturation value if the other end of the range is exceeded.

17. A unit as claimed in claim 1, wherein a round is performed to clear the x least significant bits of said result.

18. A unit as claimed in claim 1, wherein a round is performed by adding $2^{(N/2)-1}$ to said result.

19. A unit as claimed in claim 1, wherein said circuitry for modifying said result is arranged to receive information as to the sign of the total of a first and a second value and information as to one bit of a third value to determine if the result can fall out of said second range at the positive end thereof or the negative end thereof.

20. A unit as claimed in claim 1, wherein said plurality of values comprise a plurality of partial products.

21. A unit as claimed in claim 1, wherein said plurality of values comprise an accumulator.

22. A unit as claimed in claim 1, wherein a plurality of registers are provided for storing said plurality of values.

23. An arithmetic unit for adding three values, each value falling within the range $-2^{N-1}$ to $2^{N-1}-1$, to define a result, said arithmetic unit comprising:
   an input for receiving said values;
   an adder for adding said values to define a result, said result being within a first range $-2^N$ to $2^N-1$;
   a detector for determining if said result falls within a second range $-2^{N-1}$ to $2^{N-1}-1$, said second range being smaller than the first range, said detector being arranged to consider only some bits of said result; and
   circuitry for modifying said result in so that the result output by said arithmetic unit falls within the second range.

24. An arithmetic unit for adding three values, each value falling within the range $-2^{N-1}$ to $2^{N-1}-1$, to define a result, said arithmetic unit comprising:
   an input for receiving said values;
   an adder for adding said values to define a result, said result being within a first range $-2^N$ to $2^N-1$;
   circuitry for performing a round on the result, to define a rounded result, wherein the rounded result falls within a third range $-2^N$ to $2^N-1+2^{(N/2)-1}$;
   a detector for determining if said result falls within a second range $-2^{N-1}$ to $2^{N-1}-1$, said second range being smaller than the third range, said detector being arranged to consider only some bits of said rounded result; and
   circuitry for modifying said rounded result in so that the result output by said arithmetic unit falls within the second range.

25. An arithmetic unit for adding a plurality of values, each value falling within the range $-2^{N-1}$ to $2^{N-1}-1$, to define a result, said arithmetic unit comprising:
   an input for receiving said plurality of values;
   an adder for adding said values to define a result, wherein said adder comprises a carry save adder stage comprising a plurality of 3 to 2 carry save adders, said result being within a first range $-2^N$ to $2^N-1$;
   a detector for determining if said result falls within a second range $-2^{N-1}$ to $2^{N-1}-1$, said second range being smaller than the first range, said detector being arranged to consider only some bits of said result; and
   circuitry for modifying said result in so that the result output by said arithmetic unit falls within the second range.

26. An arithmetic unit for adding a plurality of values, each value falling within the range $-2^{N-1}$ to $2^{N-1}-1$, to define a result, said arithmetic unit comprising:
   an input for receiving said plurality of values;
   an adder for adding said values to define a result, wherein said adder comprises a plurality of 3 to 2 carry save adders, said result being within a first range $-2^N$ to $2^N-1$;
   circuitry for performing a round on the result to define a rounded result, wherein the rounded result falls within a third range $-2^N$ to $2^N-1+2^{(N/2)-}$;
   a detector for determining if said result falls within a second range $-2^N$ to $2^{N-1}-1$, said second range being smaller than the third range, said detector being arranged to consider only some bits of said rounded result; and
   circuitry for modifying said result in so that the result output by said arithmetic unit falls within the second range.

* * * * *

UNITED STATES PATENT AND TRADEMARK OFFICE
CERTIFICATE OF CORRECTION

PATENT NO. : 6,983,300 B2
DATED : January 3, 2006
INVENTOR(S) : Sebastien Ferroussat It is certified that error appears in the above-identified patent and that said Letters Patent is hereby corrected as shown below:

Title page,
Item [75], Inventor, should read -- Sevastien Ferroussat, Anberieu En Bugey, France --.

Column 10,
Line 53, should read -- a third range $-2^N$ to $2^N-1 +2^{(N/2)-1}$; --.

Signed and Sealed this

Fourteenth Day of March, 2006

JON W. DUDAS
*Director of the United States Patent and Trademark Office*

UNITED STATES PATENT AND TRADEMARK OFFICE
CERTIFICATE OF CORRECTION

PATENT NO. : 6,983,300 B2  
APPLICATION NO. : 09/919482  
DATED : January 3, 2006  
INVENTOR(S) : Sebastien Ferroussat Page 1 of 1

It is certified that error appears in the above-identified patent and that said Letters Patent is hereby corrected as shown below:

<u>Title page,</u>  
Item [75], Inventor, should read -- Sebastien Ferroussat, Anberieu En Bugey, France --.

<u>Column 10,</u>  
Line 53, should read -- a third range $-2^N$ to $2^N-1 +2^{(N/2)-1}$; --.

This certificate supersedes Certificate of Correction issued March 14, 2006.

Signed and Sealed this

Sixteenth Day of January, 2007

JON W. DUDAS  
*Director of the United States Patent and Trademark Office*